United States Patent
Vedula et al.

(10) Patent No.: US 11,785,005 B2
(45) Date of Patent: Oct. 10, 2023

(54) SECURE TUNNELING WITH IMPLICIT DEVICE IDENTIFICATION

(71) Applicant: Apple Inc., Cupertino, CA (US)

(72) Inventors: Srinivas Vedula, Fremont, CA (US); Joel N. Kerr, San Jose, CA (US)

(73) Assignee: Apple Inc., Cupertino, CA (US)

( * ) Notice: Subject to any disclaimer, the term of this patent is extended or adjusted under 35 U.S.C. 154(b) by 139 days.

(21) Appl. No.: 17/236,989

(22) Filed: Apr. 21, 2021

(65) Prior Publication Data

US 2022/0094668 A1 Mar. 24, 2022

Related U.S. Application Data

(60) Provisional application No. 63/082,424, filed on Sep. 23, 2020.

(51) Int. Cl.
| | |
|---|---|
| *H04L 29/06* | (2006.01) |
| *H04L 9/40* | (2022.01) |
| *H04L 9/32* | (2006.01) |
| *H04L 9/08* | (2006.01) |

(52) U.S. Cl.
CPC ........ *H04L 63/0869* (2013.01); *H04L 9/0894* (2013.01); *H04L 9/3247* (2013.01); *H04L 63/029* (2013.01); *H04L 63/0428* (2013.01); *H04L 63/0823* (2013.01); *H04L 63/166* (2013.01)

(58) Field of Classification Search
CPC .................................................. H04L 63/0869
See application file for complete search history.

(56) References Cited

U.S. PATENT DOCUMENTS

| | | | |
|---|---|---|---|
| 8,479,001 B2 | 3/2013 | Yoneda et al. | |
| 9,755,825 B2 | 9/2017 | O'Brien et al. | |
| 10,003,604 B2 | 6/2018 | Fahrny et al. | |
| 2004/0076292 A1* | 4/2004 | Sato | H04L 9/0643 380/30 |
| 2004/0243805 A1* | 12/2004 | Enokida | H04L 9/0891 713/175 |
| 2004/0250066 A1* | 12/2004 | Di Luoffo | G06Q 20/4097 713/168 |
| 2009/0164797 A1* | 6/2009 | Kramer | G06F 21/32 713/186 |
| 2013/0283037 A1* | 10/2013 | Katz | H04L 65/762 713/150 |

FOREIGN PATENT DOCUMENTS

WO  WO 2003/073688  9/2003

* cited by examiner

*Primary Examiner* — Bradley W Holder
(74) *Attorney, Agent, or Firm* — BAKERHOSTETLER

(57) ABSTRACT

The disclosed technology provides for establishment of a secure tunnel with implicit device identification. The implicit device identification can be provided during establishment of a secure tunnel with a server by performing a mutual authentication with the server using a device-specific private key of the device. The device-specific private key may be provisioned during manufacturing of the device and stored by a secure hardware component of the device. Establishing the secure tunnel using implicit device identification can be helpful for operations in which a server is configured to only establish secure communications with one or more particular types of device, and can be performed without the use additional device identification communications.

18 Claims, 5 Drawing Sheets

SECURE TUNNELING WITH IMPLICIT DEVICE IDENTIFICATION

CROSS REFERENCE TO RELATED APPLICATIONS

This application claims the benefit of priority to U.S. Provisional Patent Application No. 63/082,424, entitled "Secure Tunneling With Implicit Device Identification," filed on Sep. 23, 2020, the disclosure of which is hereby incorporated herein in its entirety.

TECHNICAL FIELD

The present description relates generally to electronic communications, including, for example, secure tunneling with implicit device identification.

BACKGROUND

Transport Layer Security (TLS) tunneling is commonly used to provide secure communication between two electronic devices or between an electronic device and a server. The root of security for a TLS tunnel is often generated based on an authentication of a user of an electronic device by a server. The user that is authorized to establish a TLS tunnel can typically provide authentication information for establishing a TLS tunnel on various devices to which they have access.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
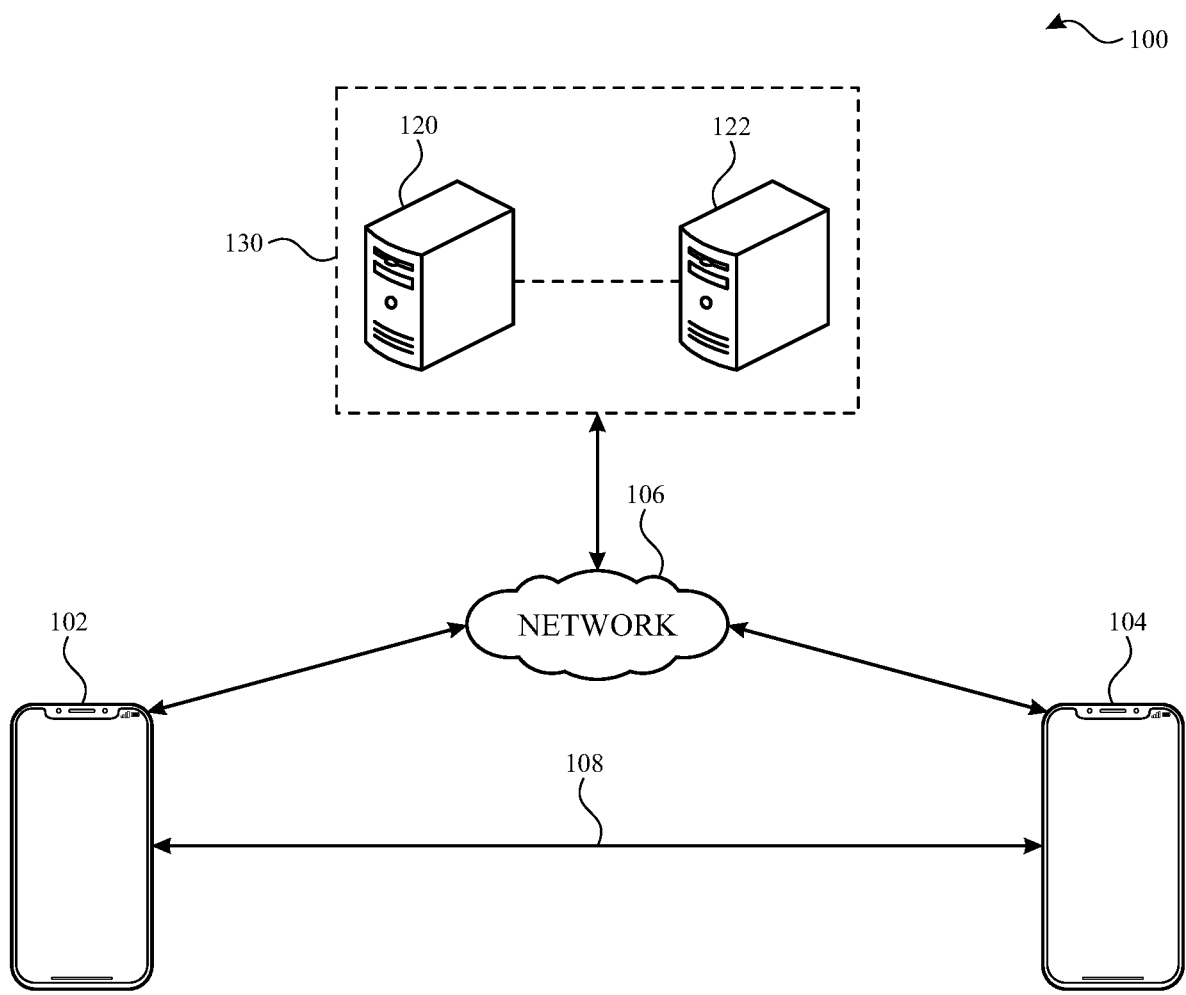
FIG. 1 illustrates an example network environment for secure tunneling with implicit device identification in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Tunneling, such as Transport Security Layer (TLS) tunneling, that uses user authentication as a root of security for communication between devices and/or servers can be useful for providing access to a service by a user on any device by which user authentication information can be provided.

However, in various scenarios, it may be desirable for a device or a server to provide access to a service (e.g., a web service) or other secure communication, only for a specific device or type of device. For example, even if a user accesses a user account at a server from multiple user devices, in some scenarios, only one or a subset of the user devices should be provided with access to one or more particular services. It can also be desirable to be able to provide particular types of direct device-to-device or peer-to-peer communication between two user devices of only one or more particular, pre-determined types.

In some scenarios, performing additional device identification operations, in addition to establishing a user-based secure connection, can create additional latency in establishing communications. Further, in some scenarios, the user authentication may not be needed, resulting in potential additional inefficiencies when a user-based root of security is used.

For example, in a video conferencing scenario in which a group of users concurrently interact with each other using multiple corresponding user devices, it may be desirable to provide communication between multiple user devices only if the user devices have a desired set of capabilities. In such a scenario, a server or other device, such as an application server that is enabling the video conferencing experience may require identification of each of the multiple user devices as having the desired set of capabilities.

In accordance with one or more implementations of the subject technology, a secure connection, such as a TLS tunnel, can be established between a device and another device or a server using a mutual authentication operation that based on a key pair that is specific to the device (e.g., specific to hardware of the device). The device-specific key pair may include a hardware-specific private key that is provisioned for the device and/or for a hardware component of the device, such as during manufacturing, and stored by a secure element of the device. The hardware-specific key pair may also include one or more hardware-specific public keys corresponding to the hardware-specific private key. A session key pair for the secure connection can be generated by the secure element of the device, using the hardware-specific private key, without exposing the hardware-specific private key outside the secure element of the device.

In one or more implementations, the device may provide further device-specific information in a device-specific certificate that is provided with data sent over the secure connection to, for example, (i) securely attest the validity of the device or device type, and (ii) provide one or more device identifiers to be used by server side logic.

In this way, systems and methods are provided with which a secure communication channel can be established in a way that implicitly provides secure device identification and attestation as part of the establishment of the connection. In one or more implementations, the secure connection can be established without dependency on user and/or account credentials.

FIG. 1 illustrates an example network environment 100 for secure tunneling using implicit device identification in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes an electronic device 102, an electronic device 104, a network 106, and one or more servers 130. The network 106 may communicatively (directly or indirectly) couple, for example, any two or more of the electronic device 102, the electronic device 104, and/or the servers 130. The servers 130 may include, as examples, an application server 120, and a proxy server 122 such as a tunneling termination proxy server (e.g., a transport layer security (TLS) termination proxy server). In one or more implementations, the proxy server 122 may handle load balancing, encryption and/or decryption, and/or tunnel establishment operations for one or more other servers of servers 130, such as for application server 120. Application server 120 can provide one or more services to electronic device 102 and/or electronic device 104 via a secure tunnel (e.g., established by the application server and/or by proxy server 122).

In one or more implementations, the network 106 may be an interconnected network of devices that may include, or may be communicatively coupled to, the Internet. In one or more implementations, the electronic device 102 and the electronic device 104 can communicate over a direct link 108 (e.g., a wired or wireless link such as a WiFi connection or a Bluetooth connection), and/or an indirect link, such as through one or more intermediary devices. For explanatory purposes, the network environment 100 is illustrated in FIG. 1 as including a single electronic device 102, a single electronic device 104, a single application server 120 and a single proxy server 122; however, the network environment 100 may include any number of electronic devices and servers.

The electronic device 102 may be, for example, a portable computing device such as a laptop computer, a smartphone, a peripheral device (e.g., a digital camera, headphones), a tablet device, a wearable device such as a watch or a head mountable device, a band, and the like, or any other appropriate device that includes one or more wireless interfaces, such as near-field communication (NFC) radios, WLAN radios, Bluetooth radios, Zigbee radios, cellular radios, and/or other wireless radios. In FIG. 1, by way of example, the electronic device 102 is depicted as a mobile device. The electronic device 102 may be, and/or may include all or part of, the electronic device discussed below with respect to FIG. 2, and/or the electronic system discussed below with respect to FIG. 5.

The electronic device 102 may communicate with the electronic device 104 via the network 106 and/or via a direct communication (e.g., peer-to-peer communication), such as NFC, Bluetooth, and/or Wi-Fi Aware that bypasses the network 106. In one or more implementations, the electronic device 102 may communicate with the electronic device 104 over the network 106 and/or the electronic device 104 (and/or the electronic device 102) may not be communicatively coupled to the network 106.

In one or more implementations, a user of the electronic device 102 may wish to access a service (e.g., a web service such as a service for interaction with a user of electronic device 104 or another web service involving or not involving electronic device 104) that is provided by a server such as application server 120 and/or by another device such as electronic device 104.

In one or more implementations, the electronic device 102 may include a secure hardware (HW) component onto which one or more device-specific and/or hardware-specific identifiers can be provisioned during manufacturing of the electronic device 102 (e.g., at a factory for manufacturing of the electronic device or a hardware component for the electronic device, prior to delivery of the electronic device to a user, and/or any time thereafter). For example, a hardware-specific private key may be stored in secure memory of the secure hardware element, the hardware-specific private key corresponding to a hardware-specific public key. In one or more implementations, the hardware-specific key may be derived from a hardware unique identifier corresponding to the electronic device 102 and/or a hardware component thereof.

The hardware-specific public key can be used, for example, to encrypt data that can only be decrypted by the secure hardware component using the hardware-specific private key. The hardware-specific private key can be used, by the secure hardware component, to digitally sign data with a signature that can be decrypted using the hardware-specific public key. In this way, a digital signature generated using the hardware-specific private key can be used to attest to the source and/or security of data transmitted by the electronic device and to implicitly identify the electronic device (e.g., because the key used to sign the data is specific to a particular device and/or a particular hardware component of a device). An example electronic device that includes a secure hardware component, such as a secure element and/or a secure enclave processor, is discussed further below with respect to FIG. 2.

Figure 2:
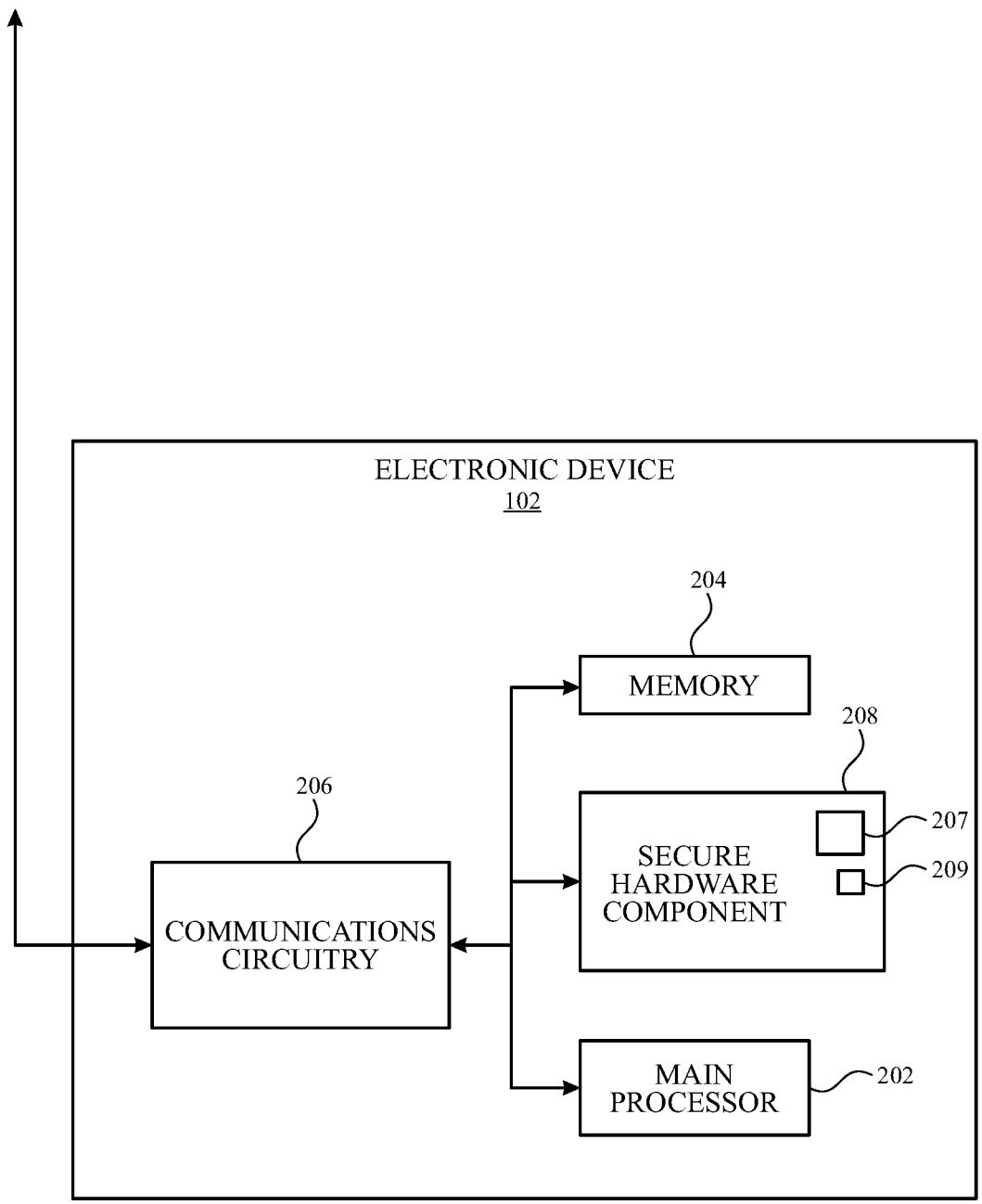
FIG. 2 illustrates an example electronic device in a system for secure tunneling with implicit device identification in accordance with one or more implementations.

FIG. 2 illustrates an example electronic device 102 in a system for secure tunneling with implicit device identification in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The electronic device 102 may include a main processor 202, a memory 204, communications circuitry 206, and a secure hardware component 208, which may be, for example, a secure element and/or a secure enclave processor. The secure hardware component 208 may include one or more interfaces for communicatively coupling to the communications circuitry 206, the memory 204, and/or the main processor 202 (e.g., a host processor), such as via one or more single wire protocol (SWP) connections and/or any other data connection.

The secure hardware component 208 may be a relatively small processor (e.g., having less processing resources and/or on-chip memory than the main processor 202) that is separate from the main processor (MP) and that primarily performs cryptographic operations for electronic device 102.

The secure hardware component 208 (also referred to herein as the SHC) may be a secure element (or secure enclave processor or the like) that includes a secure processor 207 and a small amount (e.g. 64 kb) of on-chip memory 209. The on-chip memory 209 of the secure element can only be accessed by the secure processor 207 and may be used to store symmetric and/or asymmetric keys (or information from which keys can be derived), such as a hardware-specific private key that is provisioned for the electronic device 102 and/or for the secure processor 207 during manufacturing. A hardware-specific public key corresponding to the hardware-specific private key may also be stored by the secure hardware component 208 and/or in the memory 204. The hardware-specific private key may be used to attest the identity, validity, type, and/or other hardware characteristics of the electronic device.

The keys that are stored by the secure hardware component 208 can be used to encrypt data that is to be transmitted by the electronic device using the communications circuitry 206. In one or more operational scenarios, a symmetric key encryption can be performed by the secure hardware component 208 itself (e.g., so that the main processor 202 cannot access the hardware-specific private key). In one or more operational scenarios, public/private key encryption can be performed in which the public key (e.g., a hardware-specific public key) can be provided to the main processor or to a server or another device to perform the encryption in a way that can be decrypted by the secure hardware component 208 using the corresponding private key (e.g., a hardware-specific private key) stored therein.

The communications circuitry 206 may include one or more antennas and one or more transceivers for transmitting/receiving wired and/or wireless communications. For example, the communications circuitry 206 may include circuitry for enabling the electronic device 102 to use any wireless communication protocol to communicate with the electronic device 104 and/or servers 130. For example, the communications circuitry 206 may include Bluetooth, Bluetooth low energy, Wi-Fi, Zigbee, millimeter wave (mmWave), or generally any wireless communications circuitry.

The main processor 202 (e.g., a central processing unit (CPU) which may be a host processor for the electronic device) may include suitable logic, circuitry, and/or code that enable processing data and/or controlling operations of the electronic device 102. In this regard, the main processor 202 may be enabled to provide control signals to various other components of the electronic device 102. The main processor 202 may also control transfers of data between various portions of the electronic device 102. Additionally, the main processor 202 may enable implementation of an operating system or otherwise execute code to manage operations of the electronic device 102. The main processor 202 may also control operations for running one or more applications installed on the device. In one or more operations, the main processor 202 may act as a relay between the secure hardware component 208 and an external server or another device, such as for performing mutual authentication operations and/or other operations for establishing a secure tunnel with a server or another device using the hardware-specific private key stored in the secure hardware component 208.

The memory 204 may include suitable logic, circuitry, and/or code that enable storage of various types of information such as received data, generated data, code, and/or configuration information. The memory 204 may include, for example, random access memory (RAM), read-only memory (ROM), flash, and/or magnetic storage.

In one or more implementations, one or more of the main processor 202, the memory 204, the communications circuitry 206, the secure hardware component 208, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
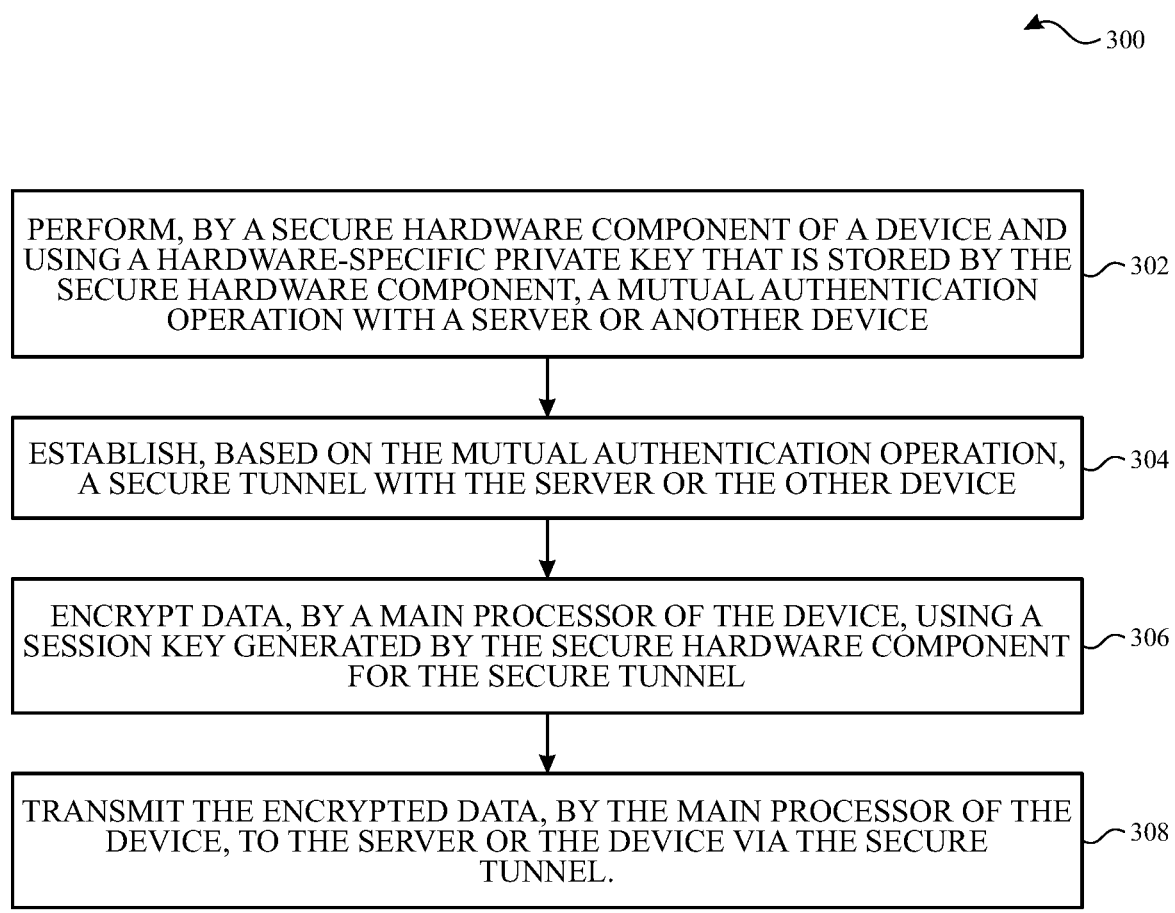
FIG. 3 illustrates a flow chart of example operations for secure tunneling with implicit device identification in accordance with one or more implementations.

FIG. 3 illustrates a flow diagram of an example process 300 for providing secure tunneling with implicit device identification in accordance with implementations of the subject technology. For explanatory purposes, the process 300 is primarily described herein with reference to the electronic device 102 and the servers 130 of FIG. 1. However, the process 300 is not limited to the electronic device 102 and the servers 130 of FIG. 1, and one or more blocks (or operations) of the process 300 may be performed by one or more other components of other suitable devices, including electronic device 102, the electronic device 104, the application server 120, and/or the proxy server 122. Further for explanatory purposes, some of the blocks of the process 300 are described herein as occurring in serial, or linearly. However, multiple blocks of the process 300 may occur in parallel. In addition, the blocks of the process 300 need not be performed in the order shown and/or one or more blocks of the process 300 need not be performed and/or can be replaced by other operations.

As illustrated in FIG. 3, at block 302, a secure hardware component of an electronic device, such as secure hardware component 208 of electronic device 102, performs, using a hardware-specific private key that is stored by the secure hardware component, a mutual authentication operation with a server (e.g., an application server 120) or another device (e.g., electronic device 104). In one or more implementations, performing the mutual authentication operation includes providing a hardware-specific public key corresponding to the hardware-specific private key to the server or the other device. In one or more implementations, the hardware-specific private key has been permanently stored by the secure hardware component during manufacturing of the device (e.g., by burning the hardware-specific key into the secure hardware component during manufacturing of the secure hardware component). In one or more implementations the secure hardware component includes a secure processor (e.g., secure processor 207) having less processing resources than the main processor, and on-chip memory (e.g., on-chip memory 209) that can only be accessed by the secure processor.

In one or more implementations, the application server 120 or the proxy server 122 may determine, as part of the mutual authentication operation with the secure hardware component 208, an identity of the electronic device. For example, based on the hardware-specific information for the secure hardware component 208, the main processor 202, and/or the electronic device 104 provided as part of the mutual authentication, the application server 120 and/or the proxy server 122 may determine whether to establish a secure tunnel with the electronic device based on the identity of the electronic device (e.g., based on whether the device is a model that is capable of enabling a particular service, and/or based on whether the device includes one or more predetermined hardware and/or software capabilities).

At block 304, based on the mutual authentication operation, a secure tunnel may be established with the server or the other device. In one or more implementations, the secure tunnel may be a transport layer security (TLS) tunnel. The secure tunnel may be established by the secure hardware component in cooperation with a main processor (e.g., main processor 202) of the device (e.g., with the main processor acting as a relay between the secure hardware element and the server of the other device). In one or more implementations (e.g., as part of the tunnel establishment operations), the secure hardware component may generate, using the hardware-specific private key, a session key for the secure tunnel. In these implementations, the secure hardware component provides the session key to the main processor of the device. The session key may be generated and provided to the main processor by the secure hardware component without exposing the hardware-specific private key outside the secure hardware component. In one or more implementations, generating the session key based on the hardware-specific private key may include decrypting encrypted information received from the server (or other device) that has been encrypted using a corresponding hardware-specific public key that was provided to the server (or other device) in a device certificate for the device, and generating the session key using the decrypted information from the server and additional information generated at the device. The server may also derive the same session key using the information that was encrypted and provided to the device, and the additional information generated at the device and provided to the server (e.g., encrypted using a public key of the server and/or signed using the hardware-specific private key of the device).

At block 306, the main processor of the device may encrypt data (e.g., data to be exchanged over the secure tunnel between the device and the server or the other device), using a session key generated by the secure hardware component for the secure tunnel. Encrypting the data may include performing a symmetric key encryption (e.g., an Advanced Encryption Standard (AES) encryption) of the data, using the session key. The server (or other device) can decrypt the encrypted data using the same session key, and/or encrypt additional data using the session key for transmission to the device and decryption at the device using the session key.

At block 308, the main processor may transmit the encrypted data to the server or the other device via the secure tunnel. The main processor may also transmit, with the encrypted data and via the secure tunnel to the server or the other device, a device certificate that is signed using the hardware-specific private key. The device certificate may be or include a unique hardware identifier of the device and/or a hardware component of the device. The device certificate may include indications of hardware and/or software properties of the device (e.g., including an identifier of the secure hardware component, an identifier of the main processor, an identifier of the electronic device, a network identifier, an identifier of an operating system of the electronic device, an identifier of an application at the electronic device, etc.).

Figure 4:
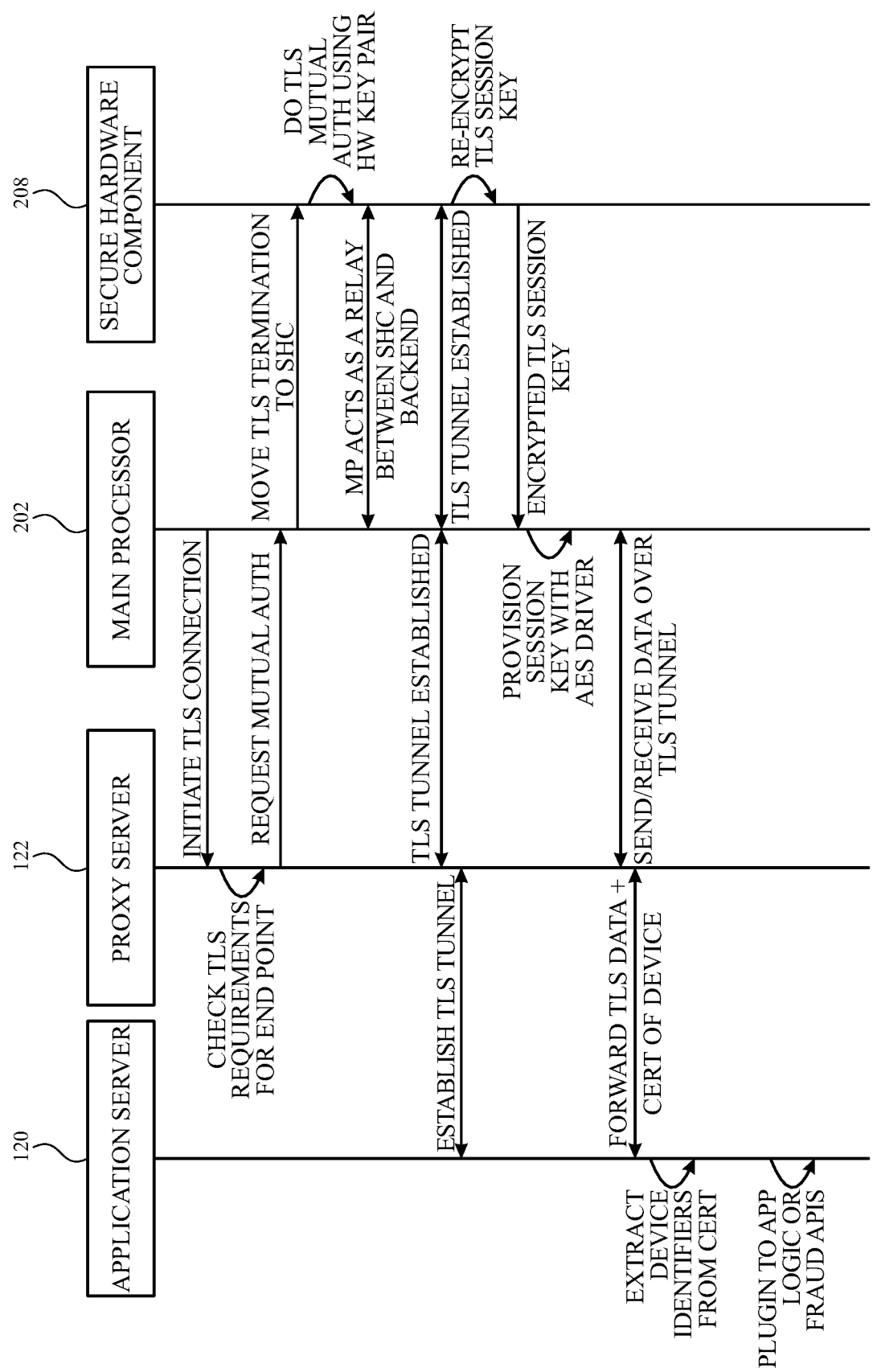
FIG. 4 illustrates a schematic diagram illustrating example data exchanges and processing operations for secure tunneling with implicit device identification in accordance with one or more implementations.

FIG. 4 is a schematic diagram illustrating additional details of various data exchanges and/or operations for secure tunneling with implicit device identification in accordance with implementations of the subject technology. In the example of FIG. 4, a TLS tunnel is established, and data is encrypting using AES encryption. However, it is appreciated that other forms of secure tunneling and/or other encryption algorithms may be used.

As shown in the example of FIG. 4, the main processor 202 of an electronic device such as electronic device 102 may initiate a secure connection with a server or another device, such as with application server 120 (e.g., by sending an initiation message to the server itself or to a proxy server such as proxy server 122). For example, the electronic device 102 may initiate a TLS connection with the application server 120. As shown, the proxy server 122 may check the tunneling requirements (e.g., TLS requirements) for a requesting device. For example, the proxy server 122 may determine that only a particular device or only a particular type of device, or only a particular set of devices or device types or capabilities can access the application server 120 (e.g., for a particular service or for any service). Responsive to determining the tunneling requirements, the proxy server 122 may request mutual authentication with the electronic device.

Requesting mutual authentication by the proxy server 122 may include providing server information for the application server 120 and/or the proxy server 122 to the electronic device with the request. For example, the proxy server 122 may provide a public key certificate and/or other information, such as a random number, to the electronic device with the request. As shown, to include an implicit device identification with the mutual authentication, the main processor 202 may move the tunneling termination (e.g., TLS termination) to the secure hardware component 208. The secure hardware component 208 may then perform mutual authentication operations using the hardware-specific public key and the hardware-specific private key stored in the secure hardware component 208. Performing the authentication operations may include providing a hardware-specific public key certificate to the proxy server 122 that is digitally signed using the hardware-specific private key. In this way, an implicit device identification can be provided as part of establishment of the secure tunnel (e.g., without a separate operation/data exchange for verifying the device in addition to the operations for establishing the secure tunnel).

Following the mutual authentication operations based on the hardware-specific key pair, the secure tunnel may be established and propagated to the application server 120. Establishing the secure tunnel may include generating a session key with the secure hardware component 208 using the hardware-specific private key, the session key to be used for encrypting and decrypting data that is exchanged via the secure tunnel. As shown in the example of FIG. 4, the secure hardware component 208 may re-encrypt the session key and provide the encrypted session key to the main processor 202.

Once the (e.g., encrypted) session key is provided to the main processor 202, the main processor can manage communications with the application server 120 via the secure tunnel. For example, as indicated in FIG. 4, the main processor 202 may use symmetric encryption (e.g., Advanced Encryption Standard (AES) encryption using an AES driver to provision the session key) using the session key to encrypt data to be sent to the application server 120 over the secure tunnel and/or to decrypt data received (e.g., encrypted by the application server 120 using the same session key) from the application server 120 over the secure tunnel.

As shown in the example of FIG. 4, data that is sent to the application server 120 via the secure tunnel may be sent together with a device-specific certificate that securely attests to the validity of the electronic device 102 and provides device identifiers that may be used for various server-side operations at the application server 120. The device identifiers that are included in the device-specific certificate may include hardware identifiers (e.g., an identifier of the main processor, an identifier of the secure hardware element, or another identifier of a hardware component of the device) and/or software identifiers (e.g., an identifier of a Wi-Fi or other network address of the electronic device, an identifier of an operating system running on the electronic device, and/or an identifier of an application or application version running on the electronic device). In one or more implementations, the device-specific certificate may be digitally signed using the hardware-specific private key (e.g., by the secure hardware component 208).

As shown, once the device identifiers are extracted from the device-specific certificate, the device identifiers can be plugged into application logic for an application or service to be provided by the application server 120 (e.g., if the certificate is determined to be good). If the certificate is determined to be fraudulent, altered or otherwise corrupted, the extracted device information may be provided to one or more fraud API's for handing fraudulent or otherwise corrupted communications.

In accordance with aspects of the disclosure, establishing the secure tunnel, using the secure hardware element and based on the hardware-specific private key that is stored by the secure hardware component, can improve the efficiency of device verification and tunnel establishment operations by implicitly providing device properties as part of the tunnel establishment operations. In this way, the device verification can be performed without the use of application level code/framework to identify the device. Instead, the device identity is verified "for free" with the tunnel connection (e.g., which can shave multiple hops to and from data center nodes).

Figure 5:
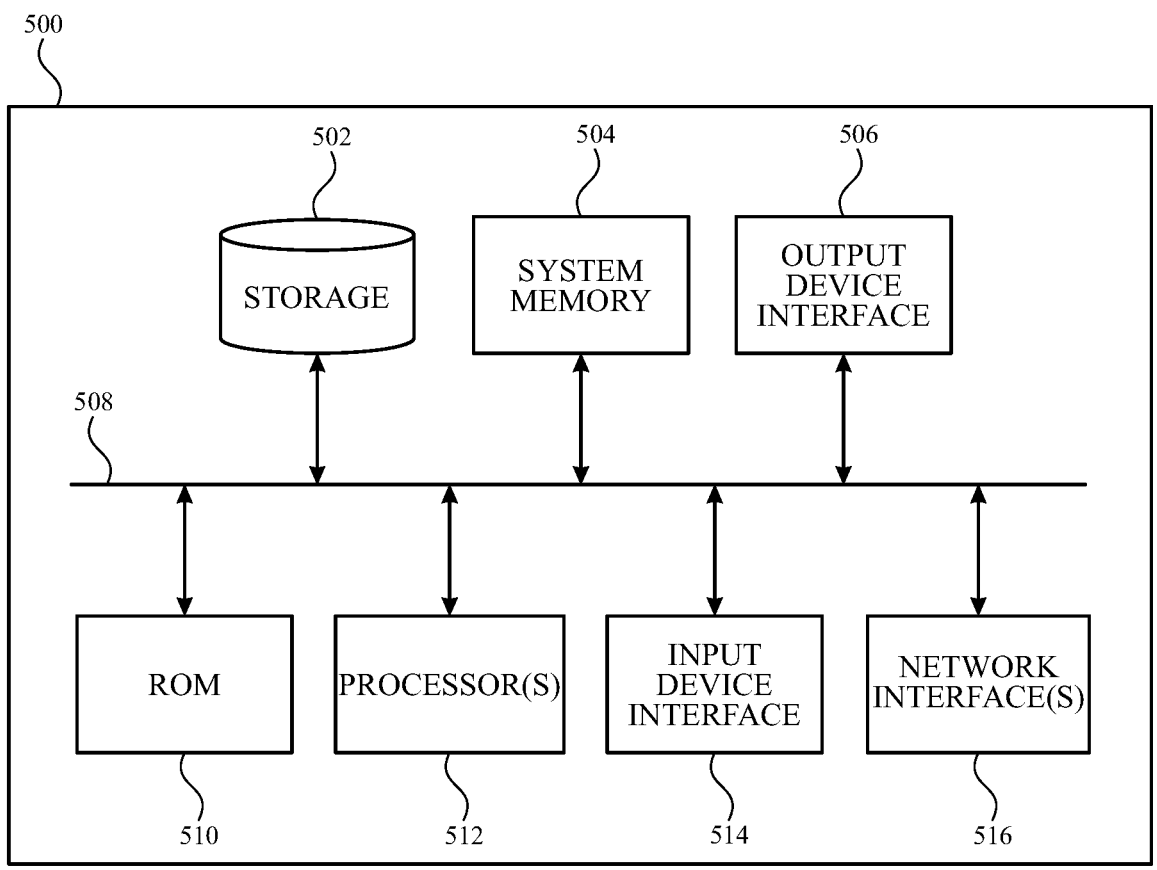
FIG. 5 conceptually illustrates an example electronic system with which aspects of the subject technology may be implemented in accordance with one or more implementations.

FIG. 5 conceptually illustrates an electronic system 500 with which one or more implementations of the subject technology may be implemented. The electronic system 500 can be, and/or can be a part of, the electronic device 102, the electronic device 104, and/or one or more of the servers 130 shown in FIG. 1. The electronic system 500 may include various types of computer readable media and interfaces for various other types of computer readable media. The electronic system 500 includes a bus 508, one or more processing unit(s) 512, a system memory 504 (and/or buffer), a ROM 510, a permanent storage device 502, an input device interface 514, an output device interface 506, and one or more network interfaces 516, or subsets and variations thereof.

The bus 508 collectively represents all system, peripheral, and chipset buses that communicatively connect the numerous internal devices of the electronic system 500. In one or more implementations, the bus 508 communicatively connects the one or more processing unit(s) 512 with the ROM 510, the system memory 504, and the permanent storage device 502. From these various memory units, the one or more processing unit(s) 512 retrieves instructions to execute and data to process in order to execute the processes of the subject disclosure. The one or more processing unit(s) 512 can be a single processor or a multi-core processor in different implementations.

The ROM 510 stores static data and instructions that are needed by the one or more processing unit(s) 512 and other modules of the electronic system 500. The permanent storage device 502, on the other hand, may be a read-and-write memory device. The permanent storage device 502 may be a non-volatile memory unit that stores instructions and data even when the electronic system 500 is off. In one or more implementations, a mass-storage device (such as a magnetic or optical disk and its corresponding disk drive) may be used as the permanent storage device 502.

In one or more implementations, a removable storage device (such as a floppy disk, flash drive, and its corresponding disk drive) may be used as the permanent storage device 502. Like the permanent storage device 502, the system memory 504 may be a read-and-write memory device. However, unlike the permanent storage device 502, the system memory 504 may be a volatile read-and-write memory, such as random access memory. The system memory 504 may store any of the instructions and data that one or more processing unit(s) 512 may need at runtime. In one or more implementations, the processes of the subject disclosure are stored in the system memory 504, the permanent storage device 502, and/or the ROM 510. From these various memory units, the one or more processing unit(s) 512 retrieves instructions to execute and data to process in order to execute the processes of one or more implementations.

The bus 508 also connects to the input and output device interfaces 514 and 506. The input device interface 514 enables a user to communicate information and select commands to the electronic system 500. Input devices that may be used with the input device interface 514 may include, for example, alphanumeric keyboards and pointing devices (also called "cursor control devices"). The output device interface 506 may enable, for example, the display of images generated by electronic system 500. Output devices that may be used with the output device interface 506 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 5, the bus 508 also couples the electronic system 500 to one or more networks and/or to one or more network nodes, such as the electronic device 102 shown in FIG. 1, through the one or more network interface(s) 516. In this manner, the electronic system 500 can be a part of a network of computers (such as a LAN, a wide area network ("WAN"), or an Intranet, or a network of networks, such as the Internet. Any or all components of the electronic system 500 can be used in conjunction with the subject disclosure.

The present disclosure recognizes that the use of such personal information data, in the present technology, can be used to the benefit of users. For example, the personal information data can be used in exchanging data over a secure tunnel established with implicit device identification. Further, other uses for personal information data that benefit the user are also contemplated by the present disclosure. For instance, health and fitness data may be exchanged over a secure tunnel established with implicit device identification.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of exchanging data over a secure tunnel established with implicit device identification, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:
performing, by a secure hardware component of a device and using a hardware-specific private key that is stored by the secure hardware component, a mutual authentication operation with a server or another device, wherein performing the mutual authentication operation includes providing a hardware-specific public key corresponding to the hardware-specific private key to the server or the other device in a device certificate that is signed using the hardware-specific private key;
establishing, based on the mutual authentication operation, a secure tunnel with the server or the other device;
generating, by the secure hardware component for the secure tunnel, a session key in part by decrypting server information encrypted by the server or the other device using the hardware-specific public key;
encrypting data, by a main processor of the device, using the session key generated by the secure hardware component for the secure tunnel; and
transmitting the encrypted data, by the main processor of the device, to the server or the other device via the secure tunnel.

2. The method of claim 1, further comprising transmitting with the encrypted data, by the main processor and via the secure tunnel to the server or the other device, another device certificate that is signed using the hardware-specific private key.

3. The method of claim 2, wherein the other device certificate includes indications of hardware and software properties of the device.

4. The method of claim 1, further comprising:
providing the session key from the secure hardware component to the main processor of the device.

5. The method of claim 4, wherein the session key is generated and provided to the main processor by the secure hardware component without exposing the hardware-specific private key outside the secure hardware component.

6. The method of claim 1, wherein the secure tunnel is a transport layer security tunnel.

7. The method of claim 1, wherein the hardware-specific private key has been permanently stored by the secure hardware component during manufacturing of the device.

8. The method of claim 1, wherein the secure hardware component comprises:

a secure processor having less processing resources than the main processor; and on-chip memory that can only be accessed by the secure processor.

9. A device comprising:

a secure hardware component configured to perform, using a hardware-specific private key that is stored by the secure hardware component, a mutual authentication operation with a server or another device, wherein performing the mutual authentication operation includes providing a hardware-specific public key corresponding to the hardware-specific private key to the server or the other device in a device certificate that is signed using the hardware-specific private key; and a main processor, configured to:

cooperate with the secure hardware component to establish, based on the mutual authentication operation, a secure tunnel with the server or the other device;

encrypt data using a session key generated by the secure hardware component for the secure tunnel; and transmit the encrypted data, by the main processor of the device, to the server or the other device via the secure tunnel, wherein the secure hardware component is further configured to generate, for the secure tunnel, the session key in part by decrypting server information encrypted by the server or the other device using the hardware-specific public key.

10. The device of claim 9, wherein the secure hardware component comprises:

a secure processor having less processing resources than the main processor; and on-chip memory that can only be accessed by the secure processor.

11. The device of claim 9, wherein the main processor is further configured to transmit with the encrypted data, via the secure tunnel to the server or the other device, another device certificate that is signed using the hardware-specific private key.

12. The device of claim 11, wherein the secure hardware component is further configured to:

provide the session key from the secure hardware component to the main processor of the device.

13. The device of claim 9, wherein the hardware-specific private key has been permanently stored by the secure hardware component during manufacturing of the device.

14. The device of claim 9, wherein the secure tunnel is a transport layer security tunnel.

15. A system, comprising:

an electronic device, the electronic device comprising:

a secure hardware component configured to perform, using a hardware-specific private key that is stored by the secure hardware component, a mutual authentication operation with a server or another device, wherein performing the mutual authentication operation includes providing a hardware-specific public key corresponding to the hardware-specific private key to the server or the other device in a device certificate that is signed using the hardware-specific private key; and a main processor, configured to:

cooperate with the secure hardware component to establish, based on the mutual authentication operation, a secure tunnel with the server or the other device;

encrypt data using a session key generated by the secure hardware component for the secure tunnel; and transmit the encrypted data, by the main processor of the device, to the server or the other device via the secure tunnel, wherein the secure hardware component is further configured to generate, for the secure tunnel, the session key in part by decrypting server information encrypted by the server or the other device using the hardware-specific public key.

16. The system of claim 15, further comprising the server, wherein the server is configured to:

determine, as part of the mutual authentication operation with the secure hardware component, an identity of the electronic device; and determine whether to establish the secure tunnel with the electronic device based on the identity of the electronic device.

17. The system of claim 15, wherein the secure hardware component of the electronic device comprises:

a secure processor having less processing resources than the main processor; and on-chip memory that can only be accessed by the secure processor.

18. The system of claim 15, wherein the secure tunnel is a transport layer security tunnel.

* * * * *